United States Patent Office 3,641,021
Patented Feb. 8, 1972

3,641,021
3,7-(RING-SUBSTITUTED) CEPHALOSPORIN COMPOUNDS
Charles W. Ryan, Indianapolis, Ind., assignor to Eli Lilly and Company, Indianapolis, Ind.
No Drawing. Filed Apr. 18, 1969, Ser. No. 817,556
Int. Cl. C07d 99/24
U.S. Cl. 260—243 C
9 Claims

ABSTRACT OF THE DISCLOSURE

Cephalosporins substituted in the 3-position with a mercaptothiazole or mercaptotetrazole and in the 7-position with a phenyl- or thienylacetyl group bearing an alpha amino or hydroxy group are highly-active antibiotics yet are unusually stable toward cephalosporinases and metabolizing liver enzymes.

BACKGROUND OF THE INVENTION

The cephalosporins are a well-known family of antibiotics that have gained wide-spread use in recent years in the treatment of disease. A large number of cephalosporins have been obtained by varying the substituents in the 3- and 7-positions of the cephalosporin nucleus. However, the search continues for compounds having high activity and a high degree of stability. Typical of the prior art compounds are the 3-acetoxymethyl derivatives which exhibit good antibiotic activity but are notoriously metabolically unstable, being particularly susceptible to liver enzymes that deacylate the acetoxy group.

SUMMARY

I have now discovered a class of cephalosporin antibiotics that exhibit a high degree of activity yet are unusually stable. My new compounds are not only relatively stable to liver enzymes but are also stable toward the cephalosporinases proliferated by gram negative bacteria. As a consequence my compounds remain available to supply antimicrobial activity for a longer period.

My new compounds are 3-(2-alkyl-1,3,4-thiadiazole-5-thiomethyl) and (3-(1-alkyl - 1,2,3,4- tetrazole-5-thiomethyl) cephalosporins in which the 7-amino group has been acylated with a phenylacetyl or thienylacetyl group bearing an amino or hydroxy substituent on the α-carbon atom. It is this combination of substituents in the 3- and 7-positions of the cephalosporin molecule that results in the desirable properties exhibited by my compounds.

DESCRIPTION OF THE PREFERRED EMBODIMENT

The compounds of my invention are those having the formula

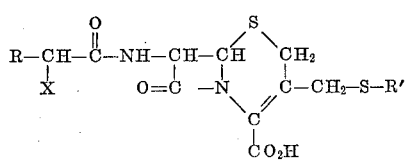

wherein R is

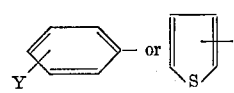

Y is hydrogen, chlorine, bromine, fluorine, trifluoromethyl, amino, nitro, hydroxy, $C_1$-$C_3$ alkyl, or $C_1$-$C_3$ alkoxy;

R' is $$\begin{matrix} N\text{---}N \\ \| \quad \| \\ -C \quad C-Z \end{matrix} \quad \text{or} \quad \begin{matrix} N\text{---}N \\ \| \quad \| \\ -C \quad N \\ \diagdown N \diagup \\ | \\ Q \end{matrix}$$

Z is hydrogen or $C_1$-$C_3$ alkyl;
Q is $C_1$-$C_3$ alkyl;

and

X is $-NH_2$, $-NHR''$, $-OH$, or $-O-\overset{O}{\underset{\|}{C}}-H$;

$R''$ is $-\overset{O}{\underset{\|}{C}}-O-C-(CH_3)_3$, $-\overset{O}{\underset{\|}{C}}-O-CH_2CCl_3$, or $-\underset{\underset{CH_3}{|}}{C}=CH-\overset{O}{\underset{\|}{C}}-O-CH_3$, and the pharmaceutically acceptable salts thereof.

Those cations which form pharmaceutically acceptable salts with acids are well known to those skilled in the art. Among the more commonly used cations for this purpose are the sodium, potassium and ammonium ions. Too, the amino group in the side chain may be converted to a salt by treatment with such acids as hydrochloric acid, hydrobromic acid, and p-toluene-sulfonic acid.

My compounds may be prepared by the displacement of the 3-acetoxy group of 7-aminocephalosporanic acid with either 1-alkyl-1,2,3,4-tetrazole-5-thiol or a 1,3,4-thiazole-5-thiol followed by acylation of the 7-amino group with the desired hydroxy- or aminoacetic acid. The displacement of an ester group with a thiol group is a well-known reaction and may be accomplished in aqueous solution at a temperature within the range of about 50° to 100° C. in the presence of a mild base such as sodium bicarbonate. An excess of the thiol is preferably employed. The alkyl group in the 1-position of the tetrazole employed may be methyl, ethyl or propyl. The thiadiazole used may have a hydrogen, methyl, ethyl, or propyl group in the 2-position.

The claimed compounds are then obtained by acylation of the 7-amino group of the thio compounds from the displacement reaction with the proper amino- or hydroxyacetic acid. The acylation of the 7-amino groups of cephalosporins is a well-known reaction and may be ac complished by means of the acid halide or a mixed anhydride. The particular method of acylation is unimportant to my invention.

Typical acids that can be used in acylating the thio compounds to obtain compounds of my invention are the phenylacetic acids, the substituted phenylacetic acids, and the thienylacetic acids substituted on the α-carbon atom with an amino or hydroxy group. Substituents that may be present on the phenyl ring of the acid include chlorine, bromine, fluorine, trifluoromethyl, amino, nitro, hydroxy, $C_1$–$C_3$ alkyl, or $C_1$–$C_3$ alkoxy. Examples of suitable acids include the following:

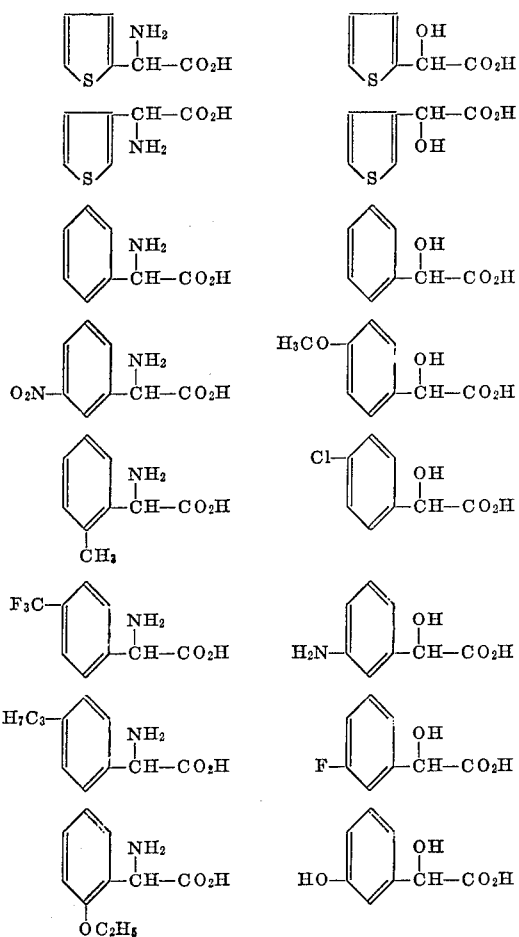

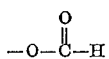

Steroisomerism occurs around the asymmetric α-carbon atom of these acids. It is well known that it is generally the D-isomer that exhibits biological activity.

It is to be understood that the α-amino and α-hydroxy groups of the acids will be protected during the acylation step. Thus, for example, the hydroxyl group may be converted to the formate ester while the amine group would be protected by such groups as the t-butyloxycarbonyl 2,2,2-trichloroethoxycarbonyl, or the enamine obtained from methyl acetoacetate. These protecting groups can then be removed at the completion of the acylation step to yield the antiobiotically-active compounds.

Thus, in the formula those compounds in which X is —NHR" or $$-O-\overset{O}{\underset{\|}{C}}-H$$

are merely intermediates in the preparation of the desired antibiotics. Those compounds in which X is amino or hydroxy are the active compounds of the invention. The preferred compounds of my invention are those in which R is phenyl or 2- or 3- thienyl, X is amino or hydroxy, and Z and Q are methyl.

The preparation of my compounds will be illustrated by the following examples.

EXAMPLE 1

To a stirred mixture of 27.2 g. (0.1 mole) of 7-aminocephalosporanic acid in 200 ml. of water and 100 ml. of acetone was added a saturated solution of sodium bicarbonate to a pH of 7.9. This solution was placed in an 80° C. bath and when the internal temperature had reached 45° C. a solution of 19.6 g. (0.15 mole) of 2-methyl-1,3,4-thiadiazole-5-thiol in 200 ml. of acetone was added. The mixture was heated in the 80° C. bath for three hours and then cooled to 10° C. and the pH was adjusted to 3.9 by the addition of 6 N hydrochloric acid. The cold mixture was stirred for 15 minutes and the solid was collected, washed with acetone, and dried. There was obtained 24 g. (70 percent) of 7-amino-3-(2-methyl-1,3,4-thiadiazole-5-thiomethyl)-$\Delta^3$-cephem - 4 - carboxylic acid. The expected structure was confirmed by nuclear magnetic resonance and ultraviolet spectroscopy.

EXAMPLE 2

Example 1 was repeated using 1-methyl-1,2,3,4-tetrazole-5-thiol instead of the thiadiazole. There was obtained 25 g. (76 percent) of 7-amino-3-(1-methyl-1,2,3,4-tetrazole-5-thiomethyl)-$\Delta^3$-cephem - 4 - carboxylic acid. Once again the structure was confirmed by nuclear magnetic resonance and ultraviolet spectroscopy.

Example 3

D-mandelic acid (15.2 g., 0.1 mole) was stirred into 250 ml. of formic acid and the mixture was allowed to stand at room temperature for two days. The solution was concentrated under vacuum, the residue dissolved in benzene, the benzene solution washed with water, dried over magnesium sulfate, filtered, and concentrated to dryness to yield 13.2 g. of D-mandelic acid formate ester. To a solution of 3.6 g. (0.02 mole) of the D-mandelic acid formate ester and 25 ml. of dry benzene at room temperature were added 5 ml. of oxalyl chloride and 1 drop of dimethylformamide. After stirring two hours at room temperature the solution was concentrated under vacuum to yield the formate ester of D-mandelyl chloride as an oil which was dissolved in 40 ml. of acetone. The acid chloride solution was added to an ice cold solution of 3.44 g. (0.01 mole) of the product from Example 1 and 5 g. of sodium bicarbonate in 100 ml. of water and 100 ml. of acetone. This mixture was stirred in the cold for one hour and then at room temperature for two hours. The acetone was removed under reduced pressure and the resulting aqueous mixture was added to a cold, stirred mixture of 100 ml. of water and 200 ml. of ethyl acetate. The pH was adjusted to 2.0 by the addition of 6 N hydrochloric acid. After filtration through a filter aid the water layer was discarded and the ethyl acetate layer was washed with water, dried over magnesium sulfate, and concentrated under vacuum to an oil. The oil was triturated with ether to cause solidification and the solid was collected and dried, yielding 4 g. of 7-(D-2-formyloxy-2-phenylacetamido) - 3 - (2 - methyl - 1,3,4 - thiadiazole - 5 - thiomethyl)-$\Delta^3$-cephem-4-carboxylic acid. To 2.64 g. (0.54 mole) of the formate protected tetrazole cephalosporanic acid in 30 ml. of water was added 2.5 g. of sodium bicarbonate and the mixture was stirred for three hours at room temperature. The mixture was diluted to 50 ml. with water, overlayered with 50 ml. of ethyl acetate, cooled in an ice bath, and the pH adjusted to 2 by the addition of hydrochloric acid. The layers were separated and the ethyl acetate layer was washed with water, dried over magnesium sulfate, and slurried with ether to precipitate the product which was collected to yield 1.4 g. of crude 7-D-mandelamido - 3 - (2-methyl-1,3,4-thiadiazole-5-thiomethyl)-$\Delta^3$-cephem-4-carboxylic acid. To 1.3 g. (0.0026 mole) of the crude acid in 5 ml. of absolute ethanol was added 2.6 ml. of 1 N sodium acetate in methanol. The mixture was stirred and cooled and the solid which precipitated was collected to yield 1.1 g. of the sodium salt of the cephalosporin acid. This sodium salt was recrystallized by dissolving in methanol and adding isopropanol to cause precipitation. This treatment gave sodium 7-D-mandelamido-3-(2-methyl - 1,3,4 - thiadiazole-5-thiomethyl)-$\Delta^3$-cephem-4-carboxylate. The structure was confirmed by nuclear magnetic resonance and ultraviolet spectroscopy. The compound had a pKa of 4.9. The free acid was also converted to the dicyclohexylamine salt which was subjected to elemental analysis.

*Analysis.*—Calculated for $C_{19}H_{18}N_4O_5S_3 \cdot C_{12}H_{23}N$ (percent): C, 56.42; H, 6.26; N, 10.61. Found (percent): C, 56.45; H, 6.34; N, 10.41.

Example 4

The procedure of Example 3 was repeated using as the nucleus the product from Example 2. There was obtained 1.1 g. of sodium 7-D-mandelamido-3-(1-methyl-1,2,3,4-tetrazole-5-thiomethyl) - $\Delta^3$ - cephem-4-carboxylate. The structure was confirmed by nuclear magnetic resonance and ultraviolet spectroscopy. The product had a pKa of 5.2.

Example 5

A solution of 2.46 g. (0.01 mole) of D-phenylglycine in which the amino group was protected with the t-butyloxycarbonyl group in 50 ml. of tetrahydrofuran was cooled to $-10°$ C. in an ice-acetone bath. To this cold solution were added 1.4 ml. of triethylamine and 1.3 ml. of isobutyl chloroformate. The solution of the resulting mixed anhydride was stirred in the cold for 20 minutes then added to a cold stirred solution of 3.44 g. (0.01 mole) of the product from Example 1 and 1.4 ml. of triethylamine in 50 ml. of water and 50 ml. of tetrahydrofuran. This reaction mixture was stirred one hour in the cold and two hours at room temperature. The tetrahydrofuran was stripped off under vacuum and the aqueous mixture was poured into a cold, stirred mixture of 50 ml. of water and 100 ml. of ethyl acetate. The pH was adjusted to 2 by the addition of 6 N hydrochloric acid. The mixture was filtered through a filter aid and the aqueous and ethyl acetate layers were separated. The ethyl acetate layer was washed with water, dried over magnesium sulfate, filtered, and evaporated to dryness under vacuum. The residue was triturated with ether and filtered to yield 4 g. of solid product. To remove the t-butyloxycarbonyl group this solid was stirred in 20 ml. of ice-cold trifluoroacetic acid for five minutes and the mixture was then concentrated under vacuum. Ten milliliters of ethyl acetate was added and the mixture was again evaporated under vacuum. The residue was stirred with 30 ml. of water and 30 ml. of methyl isobutyl ketone and tributylamine was added to a pH of 4.0. The precipitated solid was collected to yield 0.75 g. of crude 3-(2-methyl-1,3,4-thiadiazole-5-thiomethyl) - 7 - D-phenylglycylcyclamido-$\Delta^3$-cephem-4-carboxylic acid. The water layer was washed with methyl isobutyl ketone, evaporated to dryness and the residue slurried with acetonitrile and filtered to give an additional 0.86 g. of solid material. To obtain pure material 0.59 g. of the solid which was precipitated at a pH of 4 was stirred with 3 ml. of formamide, 3 ml. of water, and 1 ml. of methanol, the solution was filtered, and 20 ml. of acetonitrile was added. This mixture was cooled for several hours and the solid which precipitated was collected to give 0.15 g. of pure product. The nuclear magnetic resonance spectrum was consistent with the proposed structure and bioautograph showed one-spot material.

*Analysis.*—Calculated for $C_{19}H_{19}N_5O_4S_3 \cdot H_2O$ (percent): C, 46.04; H, 4.27; N, 14.13. Found (percent): C, 46.10; H, 4.55; N, 14.06.

EXAMPLE 6

The procedure of Example 5 was repeated replacing the thiadiazole with 1-methyl-1,2,3,4-tetrazole-5-thiol to yield 3 - (1 - methyl-1,2,3,4-tetrazole-5-thiomethyl)-7-D-phenylglycylamido-$\Delta^3$-cephem - 4 - carboxylic acid. The nuclear magnetic resonance spectrum and the bioautograph of the crude product confirmed that the desired compound had been obtained.

Following the procedures of Examples 3 through 6 the corresponding thienyl and substituted phenyl compounds are prepared by acylation with the appropriate acid. It is also possible to first acylate 7-aminocephalosporanic acid and then conduct the displacement reaction to replace the acetoxy group with the proper thio group. The particular method of preparation chosen is not important.

I claim:
1. A compound having the formula

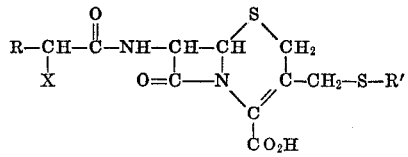

wherein R is

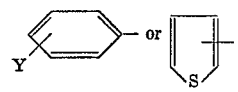

Y is hydrogen, chlorine, bromine, fluorine, trifluoromethyl, amino, nitro, hydroxy, $C_1$–$C_3$ alkyl, or $C_1$–$C_3$ alkoxy;

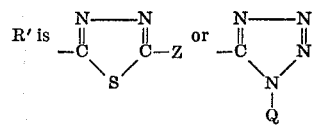

Z is hydrogen or $C_1$–$C_3$ alkyl;
Q is $C_1$–$C_3$ alkyl;

X is $-NH_2$, $-NHR''$, $-OH$, or $-O-\overset{O}{\underset{\|}{C}}-H$; and

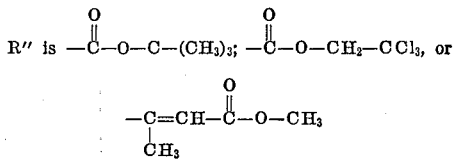

and the pharmaceutically acceptable salts thereof.

2. A compound as in claim 1 wherein R is phenyl, X is amino, and R' is

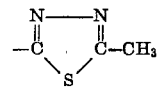

3. A compound as in claim 1 wherein R is phenyl, X is amino, and R' is

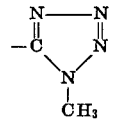

4. A compound as in claim 1 wherein R is phenyl, X is hydroxy, and R' is

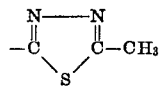

5. A compound as in claim 1 where R is phenyl, X is hydroxy, and R' is

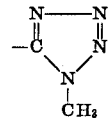

6. A compound as in claim 1 wherein R is thienyl, X is amino, and R' is

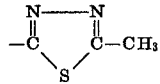

7. A compound as in claim 1 wherein R is thienyl, X s amino, and R' is
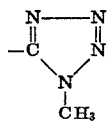
8. A compound as in claim 1 wherein R is thienyl, X is hydroxy, and R' is
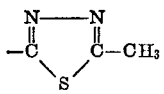
9. A compound as in claim 1 wherein R is thienyl, X is hydroxy, and R' is
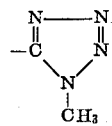
References Cited
UNITED STATES PATENTS
3,516,997  6/1970  Takano et al. ----- 260—243 C
NICHOLAS S. RIZZO, Primary Examiner
U.S. Cl. X.R.
260—999